No. 862,051. PATENTED JULY 30, 1907.
B. T. CHAYTOR.
NON-WEARING AXLE FOR WHEELS.
APPLICATION FILED OCT. 5, 1906.

Witnesses:

Inventor
Brian T. Chaytor
by James L. Norris.
atty

UNITED STATES PATENT OFFICE.

BRIAN TUNSTALL CHAYTOR, OF TE PUKE, NEW ZEALAND, ASSIGNOR OF ONE-HALF TO WILLIAM BRADY, OF TE PUKE, NEW ZEALAND.

NON-WEARING AXLE FOR WHEELS.

No. 862,051.	Specification of Letters Patent.	Patented July 30, 1907.

Application filed October 5, 1906. Serial No. 337,653.

*To all whom it may concern:*

Be it known that I, BRIAN TUNSTALL CHAYTOR, subject to His Majesty the King of the United Kingdom of Great Britain and Ireland, and a resident of Te Puke, in the Provincial District of Auckland and Colony of New Zealand, farmer, have invented a Non-Wearing Axle for Wheels of Every Description, of which the following is a specification.

The purpose of this invention is to provide cylindrical fittings within the hub of a wheel and over the axle which shall render the axle and hub non wearing. This result is obtained by fixing an inner cylinder to the outer end of the axle and an outer cylinder to the inside of the hub and so that the outer cylinder will revolve on the inner cylinder.

The accompanying drawing shows eight figures of which

Figure 1:
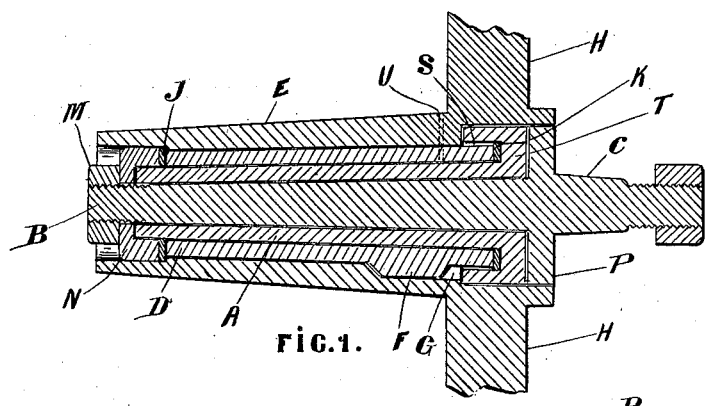
Figure 2:
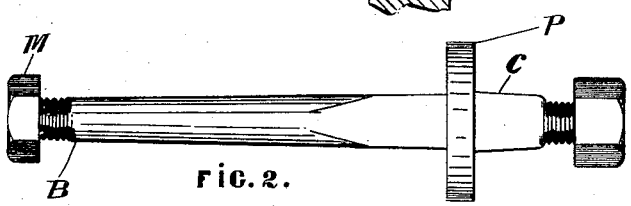
Figure 3:
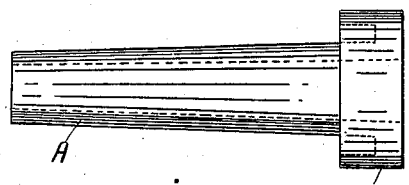
Figure 4:
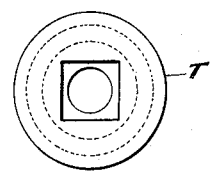
Figure 5:
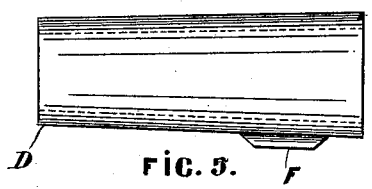
Figure 6:
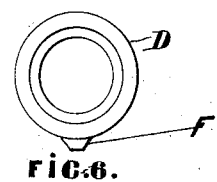
Figure 7:
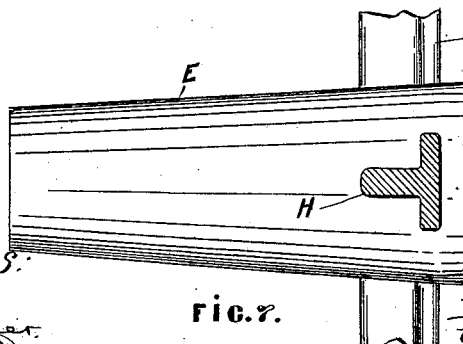
Figure 8:
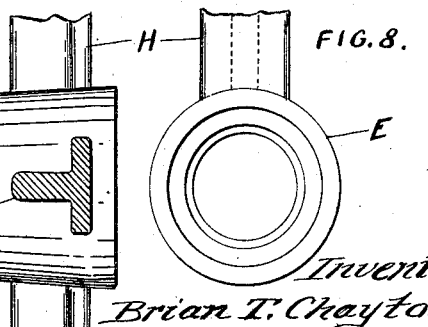

Figure 1 is a sectional elevation of the hub, projecting spokes, outer cylinder, inner cylinder, and axle fitted thereinto. Fig. 2 is a horizontal view of the axle, Fig. 3 is a horizontal view of the inner cylinder, Fig. 4 is an end view of the larger end of inner cylinder, Fig. 5 is a horizontal view of the outer cylinder showing key as part thereof, Fig. 6 is an end view of the larger end of outer cylinder Fig. 7 is a horizontal view of the hub and spokes, and Fig. 8 is an end view of the larger end of hub.

The inner cylinder A is fixed to the outer end B of the axle C so as to revolubly fit into the outer cylinder D which is fixed to the hub E by the key F fitting into the slot G and so engaging one to the other, two or more spokes H are cast with or radiate from the hub E in the usual way. When the cylinders A and D are fixed respectively to the axle C and hub E the end B is screwed tight by the nut M on to the metal washer N. The shoulder P is provided as part of the axle C so as to fit against the larger end of the cylinder A and the axle C is squared just below the shoulder P so that the axle C can be fixed to the cylinder A when it is placed thereover. The recess S is provided in the head T of the cylinder A to allow the larger end of the cylinder D to fit and revolve therein. Leather washers J and K are provided to keep oil or other lubricant from leaking out which oil or lubricant can be fed in through the oil hole U as required to ease friction between the two cylinders A and D.

The cylinders A and D fitted as just described will revolve the one around the other as the whole turns round whereby the friction and wear and tear are between the cylinders and not on the axle in the event of one or the other or both being worn it or the both can be taken off and replaced by a new cylinder or cylinders thus providing a nonwearing axle as specified in the title hereof. The effect of this non-wearing will be that the axle will last as long as the wheel it is fitted to and probably longer and be available for further continuous use. The economy and usefulness of these cylinders is apparent and their use should tend to reduce accidents to a minimum.

Having fully described my invention what I desire to claim and secure by Letters Patent is:—

In combination with a wheel hub, a vehicle axle having a terminal spindle, a circular flange radiating therefrom, a circular abutment formed in said hub, an inner sleeve fixed to the outer end of said axle, an outer sleeve keyed to said hub, said inner sleeve having a terminally formed collar with an annular recess therein, said collar engaging said circular abutment, one end of said outer sleeve being adapted to fit in said recess, said axle having a screw-threaded terminal carrying a washer and being adapted to abut against the other terminals of the inner and outer sleeves, and a lock nut for securing said washer in position.

BRIAN TUNSTALL CHAYTOR.

Witnesses:
GEORGE WILLIAM BASLEY,
HILDA MAY FROUDE.